April 9, 1940.   W. W. MacDONALD   2,196,533
TRUCK
Filed Jan. 24, 1938
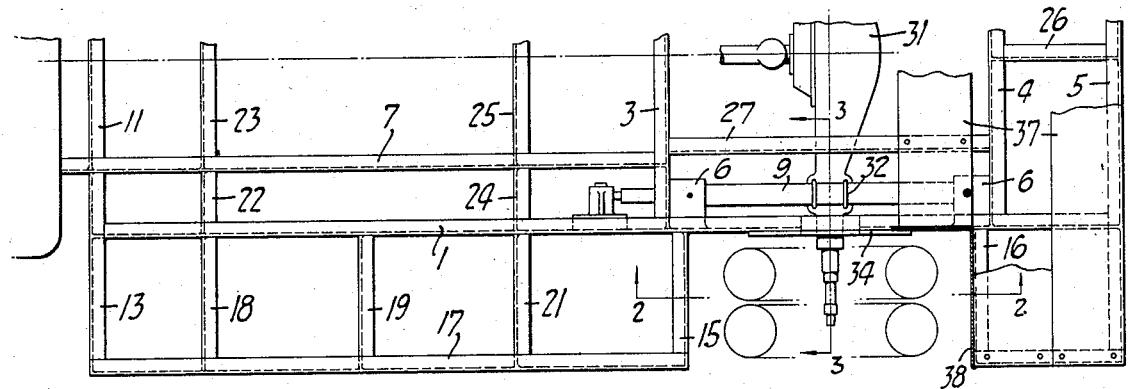
FIG_1_
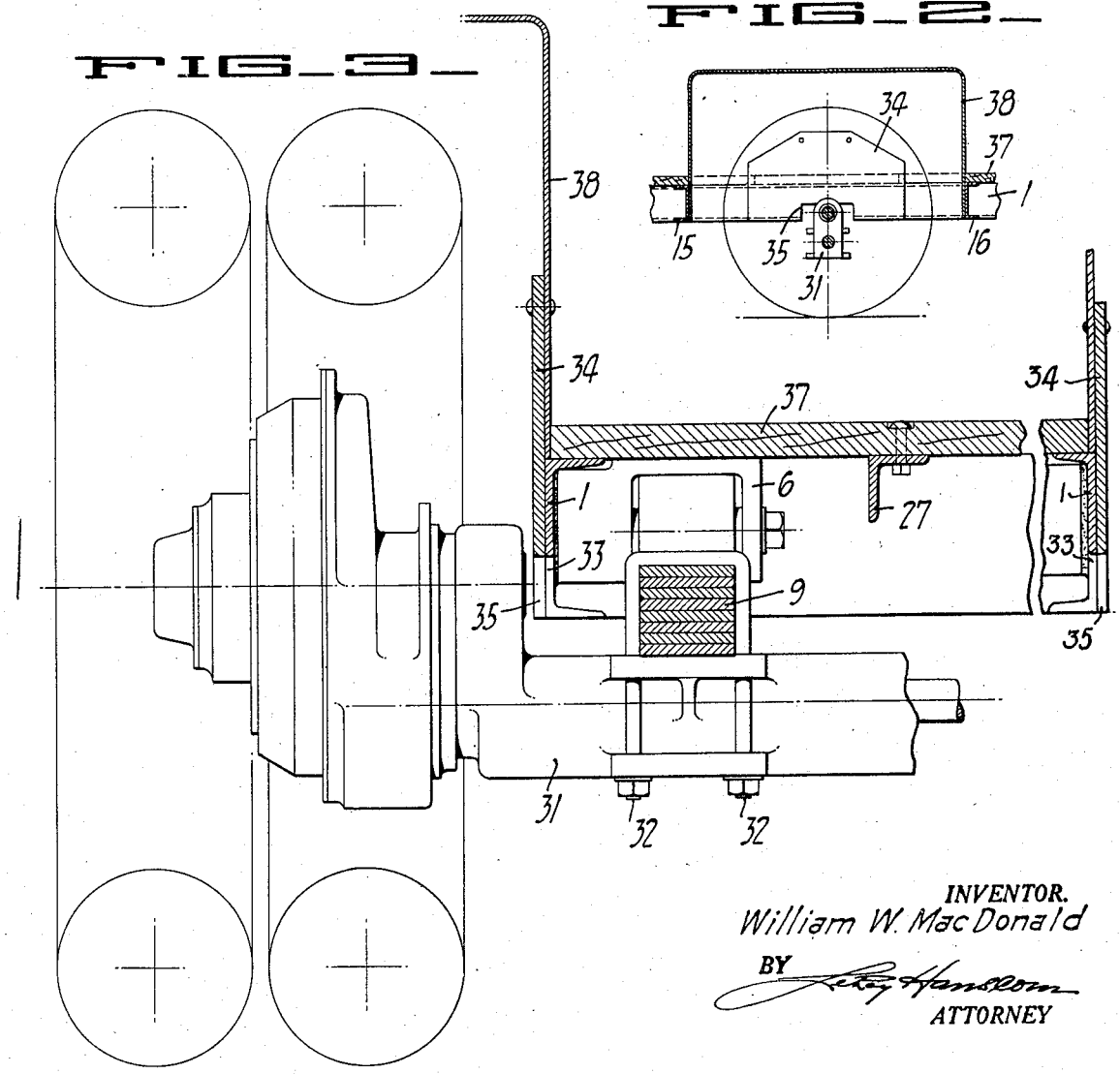
FIG_3_   FIG_2_
INVENTOR.
William W. MacDonald
BY
ATTORNEY Patented Apr. 9, 1940

2,196,533

UNITED STATES PATENT OFFICE 2,196,533

TRUCK

William W. MacDonald, Mountain View, Calif., assignor to Max L. Rosenfeld, San Francisco, Calif.

Application January 24, 1938, Serial No. 186,609

2 Claims. (Cl. 280—106.5)

This application is a continuation in part of my application Serial No. 47,931 filed on November 2, 1935, which was issued on February 27, 1938 as Patent No. 2,109,177, and relates to low bed heavy duty trucks. Two of the essentials of a truck designed for heavy duty are (a) that the loading platform be kept as low as possible without diminishing the required road clearance, and (b) that substantially the maximum over all width of a vehicle permitted by state laws be made available for loading purposes without resorting to loading platforms having two or more levels. These conditions should of course be met without decreasing the requisite strength of the chassis or frame, and in this connection it should be borne in mind that heavy duty trucks are as a rule not provided with bodies, and consequently the frame must of itself be sufficiently rigid to withstand distortion.

In general, the object of this invention is the provision of a rigid, low bed heavy duty truck chassis.

More specifically the object of my invention is the provision of a vehicle chassis in which the rear springs are disposed within the load rails, the load rails are notched to permit vertical play of the rear axle and are reinforced by means of an arch extending well above the load rails.

The invention possesses other advantageous features, some of which with the foregoing will be set forth at length in the following description where that form of the invention which has been selected for illustration in the drawing accompanying and forming a part of the present specification is outlined in full. In said drawing, one form of the invention is shown, but it is to be understood that it is not limited to such form, since the invention as set forth in the claims may be embodied in a plurality of forms.

Referring to the drawing:

Figure 1 is a fragmentary plan view of the chassis of a heavy duty truck. The chassis is symmetrical with respect to its longitudinal center line and only one-half of the chassis has been illustrated.

Figure 2 is a section taken on the line 2—2 of Figure 1 showing in elevation the arches or plates used for reinforcing the notched load rails.

Figure 3 is an enlarged section taken on the line 3—3 of Figure 1 showing the frame construction immediately above the rear axle housing of the vehicle.

As illustrated in Figure 1, a single deck loading platform of maximum width between the rear wheels is obtained by means of a pair of spaced parallel load rails 1, extending the full length of the loading platform, and inter-connected by means of a pair of spaced cross rails 3 and 4, and by a rear end rail 5 defining the width of the loading platform. Welded to the inner corners of the rectangle formed by the rails 1, 3, and 4, are spring carriers 6 which also serve to make the frame more rigid. Welded to the cross rail 3 at spaced points substantially in line with the inner faces of the spring carriers 6, are a pair of main rails 7 extending forward beyond the front end of the load rails 1, in parallelism therewith to form the neck of the frame and to support the engine. It will therefore be seen that the main rails 7, together with the load rails 1 and the cross rail 3, may be considered as forming interior offsets within which springs 9 are adapted to lie. The springs 9 may also be considered as lying within the load rails 1, and the rearward continuation of lines defined by the main rails 7. Extending between the main rails 7 in line with the forward ends of the load rails 1, is a forward end rail 11, and extending outwardly from the main rails 7 in line with the forward end rail 11 are rails 13 welded to the load rails 1. Extending outwardly from the load rails 1 from points substantially in line with the spring carriers 6, are a pair of cross rails 15 and 16 which define with the load rails 1, rectangular recesses for accommodating the rear wheels of the vehicle. Extending between the outer ends of the rails 13 and 15 and welded thereto are side rails 17.

Extending between the load rails 1 and the side rails 17 are a number of spaced stiffening cross rails 18, 19, and 21. A cross rail 22 in line with the cross rail 18, extends between the load rail 1 and the main rail 7 and a cross rail 23 in line with the rails 18 and 22, extends between the main rails 7. In the same manner cross rails 24 in line with the cross rails 21, extend between the load rails 1 and the main rails 7 and cross rails 25 in line with the rails 21 and 24 extend between the main rails 7. Extending between the cross rail 4 and the rear end rail 5 intermediate their ends, is a central rail 26. Extending between the cross rails 3 and 4 are a pair of spaced angle iron floor rails 27. All of the rails above referred to with the exception of rails 27 are formed of channels, and all joints are made by welding.

Since the frame is symmetrical with respect to its center line, it is felt that the above description of the lower half of the chassis sufficiently illustrates the construction involved without the necessity of illustrating and describing the upper half.

Centrally located within the rectangle formed by the four rails 1, 3, and 4, is an axle housing 31, to the outer ends of which are secured the leaf springs 9, by means of the usual U-bolts 32. The lower edges of the load rails 1 are notched as at 33 to permit vertical movement of the axle housing 31 upon compression of the springs 9. Since the load rails 1 are materially weakened by the notches 33, they are reinforced at this point by arches or stiffening plates 34 welded to the outer faces of the rails 1 and provided with notches 35 complementary to the notches 33.

Due to the construction of the chassis frame as above described, and which, contrary to prior practice, permits the springs 9 to be located within the load rails 1, the arches or stiffening plates 34 may be made as deep as necessary to compensate for the weakening of the load rails 1 by the notches 33, without decreasing the width of the flooring 37 supported on the load rails 1. As shown in Figures 2 and 3, the stiffening plates 34 extend well above the flooring 37 and serve as supports for the fenders 38.

Ordinarily, the load rails of a vehicle are located on the inside of the springs and therefore any stiffening members used to reinforce them must of necessity terminate below the floor level if the flooring is to extend over the springs. The degree to which the load rails are reinforced is therefore determined by the space available below the floor rather than by the load to which the load rails are to be subjected during operating conditions. As a result of the construction which I have developed, the stiffening plates may be made as deep as actually required by the service for which the vehicle is designed.

I claim:

1. A vehicle chassis comprising: a pair of spaced load rails; rear springs secured to said chassis within said load rails; an axle housing supported by said springs; reinforcing plates secured to the outer faces of said load rails in line with said axle housing and extending well above said rails, said rails and plates being notched on their lower edges to permit vertical movement of said axle housing upon compression of said springs; and flooring supported on the upper edges of said load rails and between said reinforcing plates.

2. A vehicle chassis comprising: a pair of spaced channels having their flanges extending inwardly and forming the load rails of the chassis; rear springs secured to said chassis within said channels; an axle housing supported by said springs; reinforcing plates welded to the outer faces of the webs of said channels in line with said axle housing and extending well above said channels, said channels and plates being notched on their lower edges to permit vertical movement of said axle housing upon compression of said springs; and flooring supported by said channels between said reinforcing plates.

WILLIAM W. MacDONALD.